(12) United States Patent
Nicolet et al.

(10) Patent No.: US 7,629,958 B1
(45) Date of Patent: Dec. 8, 2009

(54) WIRELESS INPUT DEVICES FOR COMPUTER SYSTEM

(75) Inventors: Patrick Nicolet, Mountain View, CA (US); Jacques Chassot, Bussy (CH); Xavier Bize, Gex (FR)

(73) Assignee: Logitech Europe S.A., Romanel-sur-Morges (CH)

( * ) Notice: Subject to any disclaimer, the term of this patent is extended or adjusted under 35 U.S.C. 154(b) by 542 days.

(21) Appl. No.: 10/886,064

(22) Filed: Jul. 6, 2004

Related U.S. Application Data (60) Provisional application No. 60/484,629, filed on Jul. 3, 2003.

(51) Int. Cl.
*G06F 3/02* (2006.01)
(52) U.S. Cl. ...................... 345/156; 345/168
(58) Field of Classification Search ......... 345/156–172, 345/1.2; 713/310, 320; 341/22, 176; 340/407.1
See application file for complete search history.

(56) References Cited

U.S. PATENT DOCUMENTS

| | | | | |
|---|---|---|---|---|
| 5,396,546 | A * | 3/1995 | Remillard | 379/93.24 |
| 5,790,873 | A * | 8/1998 | Popper et al. | 713/300 |
| 5,850,340 | A * | 12/1998 | York | 700/83 |
| 6,092,117 | A * | 7/2000 | Gladwin et al. | 709/239 |
| 6,275,682 | B1 * | 8/2001 | Yen et al. | 455/41.2 |
| 6,882,334 | B1 * | 4/2005 | Meyer | 345/156 |
| 6,950,859 | B1 * | 9/2005 | Bartek et al. | 709/217 |
| 6,985,755 | B2 * | 1/2006 | Cadieux et al. | 455/557 |
| 7,015,833 | B1 * | 3/2006 | Bodenmann et al. | 341/20 |
| 7,165,171 | B2 * | 1/2007 | Zhang et al. | 713/1 |
| 2002/0102996 | A1 * | 8/2002 | Jenkins | 455/456 |
| 2003/0197607 | A1 * | 10/2003 | Striemer | 340/539.1 |

\* cited by examiner

*Primary Examiner*—Chanh Nguyen
*Assistant Examiner*—Pegeman Karimi
(74) *Attorney, Agent, or Firm*—Townsend and Townsend and Crew LLP (57) ABSTRACT

A wireless communication system for a computer includes a hub coupled to the computer. The hub includes a first module and a second module, the first module configured to receive commands from one or more wireless input devices, the second module configured to control the first module and interface with the computer. A first wireless input device is configured to be linked to the hub to input a first command to the computer via the hub. A second wireless input device is configured to be linked to the hub to input a second command to the computer via the hub. The hub is configured to support a first operational mode and a second operational mode. The first module transmits the first and second commands received from the first and second input devices to the computer via the second module during the first operational mode. The first module transmits the first and second commands received from the first and second input devices to the computer without using the second module as an interface to the computer during the second operational mode.

33 Claims, 10 Drawing Sheets

Part 1:

Part 2:

Part 3:

Part 4:

WIRELESS INPUT DEVICES FOR COMPUTER SYSTEM

CROSS-REFERENCES TO RELATED APPLICATIONS

This application claims priority to U.S. Provisional Patent Application No. 60/484,629, titled "Wireless Input Device for Computer System," filed Jul. 3, 2003, and is incorporated by reference herein in its entirety including all appendices thereto and all references incorporated by reference therein.

BACKGROUND OF THE INVENTION

The present invention relates to a wireless input device system for a host device such as a computer.

Infrared ("IR") communication is a common form of short distance wireless communication between a personal computer ("PC") and a wireless peripheral devices. IR communication is generally effective only at a very short distance (e.g., a few meter) and requires an unobstructed line of sight between ports on two communicating devices. These limitations associated with IR communication are problematic in the modern world of portable electronic devices.

Another form of wireless communication is radio frequency ("RF") communication. A promising wireless technology, Bluetooth™, is based on RF communication. Bluetooth™ is a standard developed by a group of electronics manufacturers that allows various electronic equipment to make its own connections, without wires, cables or any direct action from a user.

Microsoft has recently released a combination wireless keyboard and mouse using Bluetooth™ technology, which communicates with a wireless hub. The hub connects to the computer via a cable to the USB port of the computer.

BRIEF SUMMARY OF THE INVENTION

The present invention uniquely separates the number pad from a keyboard providing a separate, wireless device. This separate wireless device with the number pad includes a display and has multiple modes of operation.

In one embodiment, a wireless communication system for a computer includes a hub coupled to the computer. The hub includes a first module and a second module, the first module configured to receive commands from one or more wireless input devices, the second module configured to control the first module and interface with the computer. A first wireless input device is configured to be linked to the hub to input a first command to the computer via the hub. A second wireless input device is configured to be linked to the hub to input a second command to the computer via the hub. The hub is configured to support a first operational mode and a second operational mode. The first module transmits the first and second commands received from the first and second input devices to the computer via the second module during the first operational mode. The first module transmits the first and second commands received from the first and second input devices to the computer without using the second module as an interface to the computer during the second operational mode.

In another embodiment, a wireless communication system for a host includes an external hub coupled to the host. The hub includes a first module and a second module, the first module configured to receive commands from one or more wireless input devices, the second module configured to control the first module. A wireless keyboard is configured to be linked to the hub to input a first command to the host via the hub. A wireless pointing device is configured to be linked to the hub to input a second command to the host via the hub. The hub is configured to support a first operational mode and a second operational mode. The hub is configured to support M number of peripheral devices in the first operational mode and N number of peripheral devices in the second operational mode, wherein N is greater than M.

In yet another embodiment, a method for operating a computer system comprises connecting a hub to a host computer, said hub being configured to communicate wirelessly with at least two peripheral devices; pairing a wireless mouse to the hub to enable input of first information that has been generated using the mouse to the computer via the hub; and pairing a wireless keyboard to the hub to enable second information that has been generated using the keyboard to the computer via the hub, wherein the hub is configured to support a first operational mode and a second operational mode, the hub being able to support a different number of input devices for each of the first and second operational modes.

The present invention provides a default, embedded mode of Bluetooth with limited capabilities, that is stored in a memory in a hub. The hub wirelessly connects to devices using Bluetooth™, and connects to the computer using a USB or other connection. The embedded mode is used to connect the input devices—the mouse, keyboard or MediaPad™ device. It operates before log-on, without the need to click on windows on a display or enter data, since this requires the devices to be connected first. Once a connection is established, and the input devices are operation, the full Host Controller Interface (HCI) version of Bluetooth™ is switched to. The HCI version allows more devices to be communicated with, and enhanced capabilities for communication.

After a connection, when the computer goes into a sleep mode, the systems switches back to the imbedded mode. This simplifies the connection of the input devices to wake-up the computer, since connection can be done using the embedded, or mini, Bluetooth☐ software stored in the hub in flash memory.

For a further understanding of the nature and advantages of the invention, reference should be made to the following description taken in conjunction with the accompanying drawings.

DETAILED DESCRIPTION OF THE INVENTION

Figure 1:
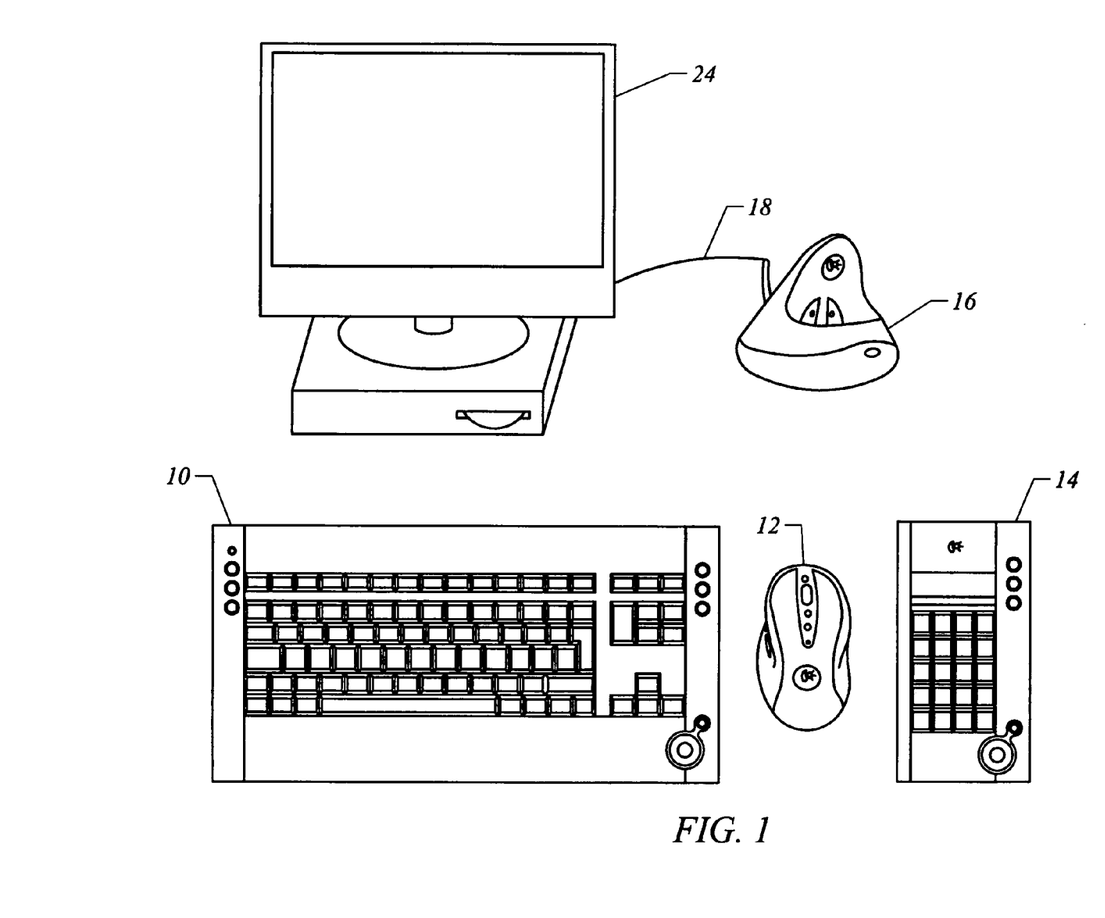
FIG. 1 is a diagram illustrating the components of a system according to the present invention.

FIG. 1 illustrates a wireless keyboard 10, wireless mouse 12 and wireless MediaPad™ device 14. All three of these communicate with a wireless hub 16, which is connected via a USB cable 18 to the USB port of a computer 20. The computer can be loaded with software from a compact disk 22, and includes a display 24.

Keyboard 10, mouse 12 and MediaPad™ device 14 all communicate using Bluetooth™ technology with hub 16. Hub 16 also acts as a battery charger for charging the batteries of mouse 12, which is preferably an optical mouse.

Figure 2:
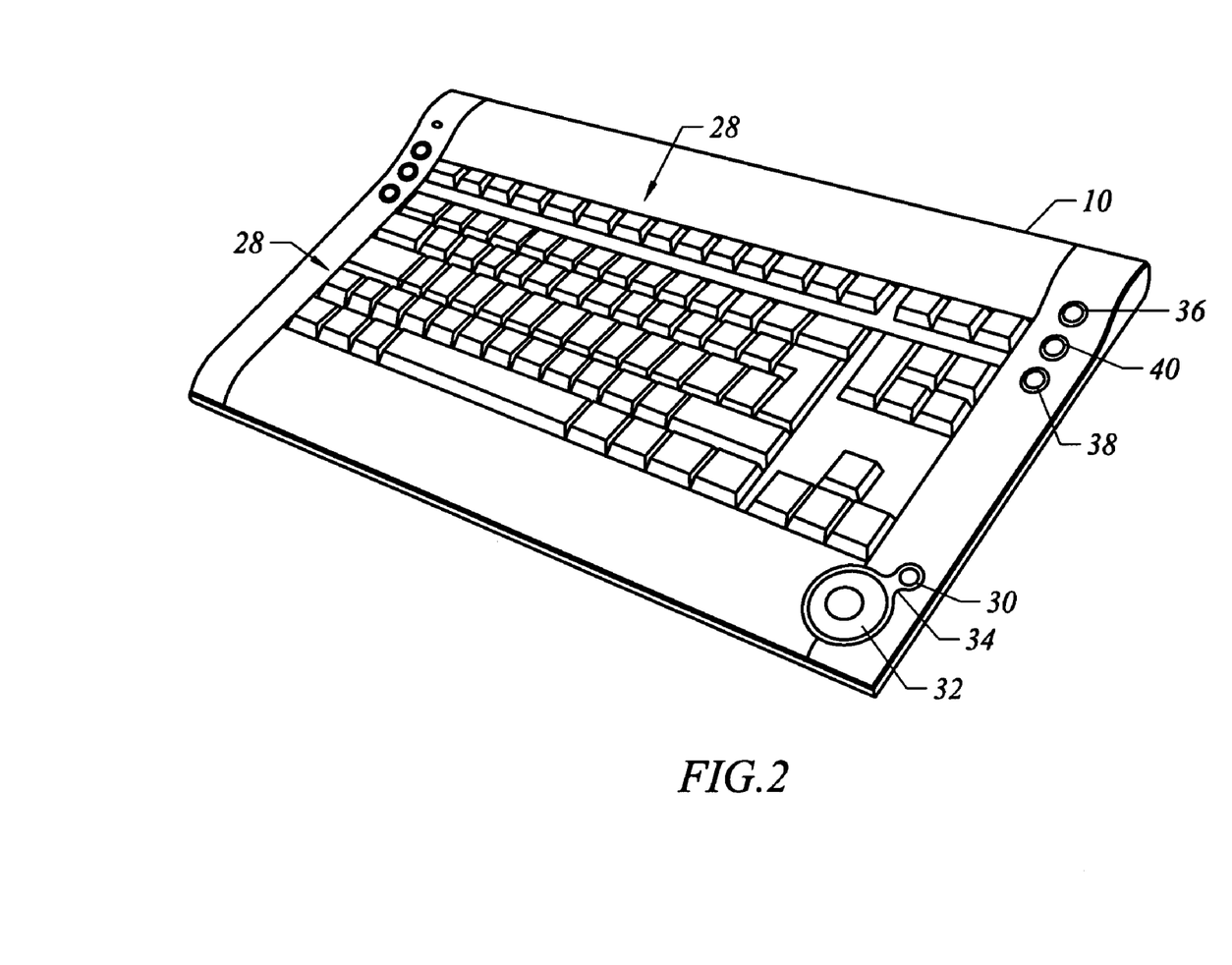
FIG. 2 illustrates a keyboard according to one embodiment of the present invention.

FIG. 2 illustrates keyboard 10 in more detail. The keyboard includes a standard alpha-numeric key array 26, and function keys 28. In addition, it includes a media button 30 for launching a media application which can play music, videos, and display pictures. Media button 30 is visually linked to a four-way button 32 for selecting among media options, such as stop, forward, reverse and play/pause. Buttons 30 and 32 are visually linked by a plate 34. The keyboard also includes a volume up button 36, volume down button 38 and mute button 40.

Figure 3:
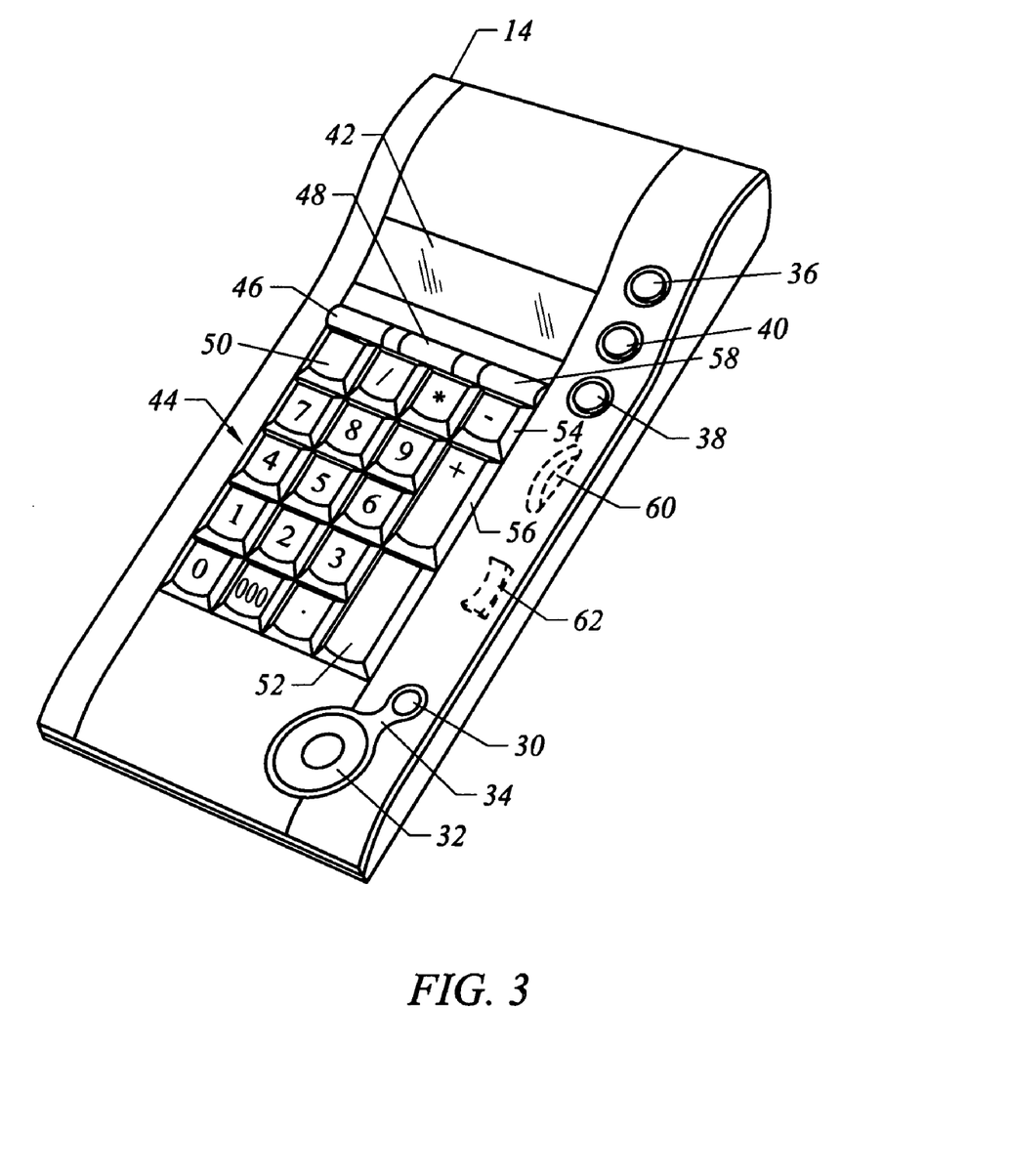
FIG. 3 illustrates a MediaPad™ device according to one embodiment of the present invention.

MediaPad™ device 14 is illustrated in more detail in FIG. 3. The MediaPad™ device includes a liquid crystal display (LCD) 42. A number pad 44 is included, and a number pad button 46 selects the number pad function for the number pad buttons. A navigate button 48 selects the alternate functions for these number pads. In one embodiment, button 1 is "open", button 3 is "closed", button 7 is "back", button 9 is "forward", button 5 is a "Windows Start launching button?", and buttons 4, 8, 6, and 2 are directional arrows for left, up, right, and down, respectively.

Also included is a clear button 50, an enter button 52, a subtraction button 54, an addition button 56, and backslash (/) and asterisk (*) buttons as indicated. A calculate button 58 activates a calculator application.

The MediaPad™ device also includes buttons which duplicate buttons on the keyboard. These are the volume up button 36, mute button 40, and volume down button 38, as well as media button 30, four-way button 32 and plate 34.

In one embodiment, the MediaPad™ device also includes a scrolling wheel 60 which allows scrolling up or down in any application. In addition, a rocker switch 62 or a wheel could be used to allow zooming in and out of any type of document.

Figure 4:
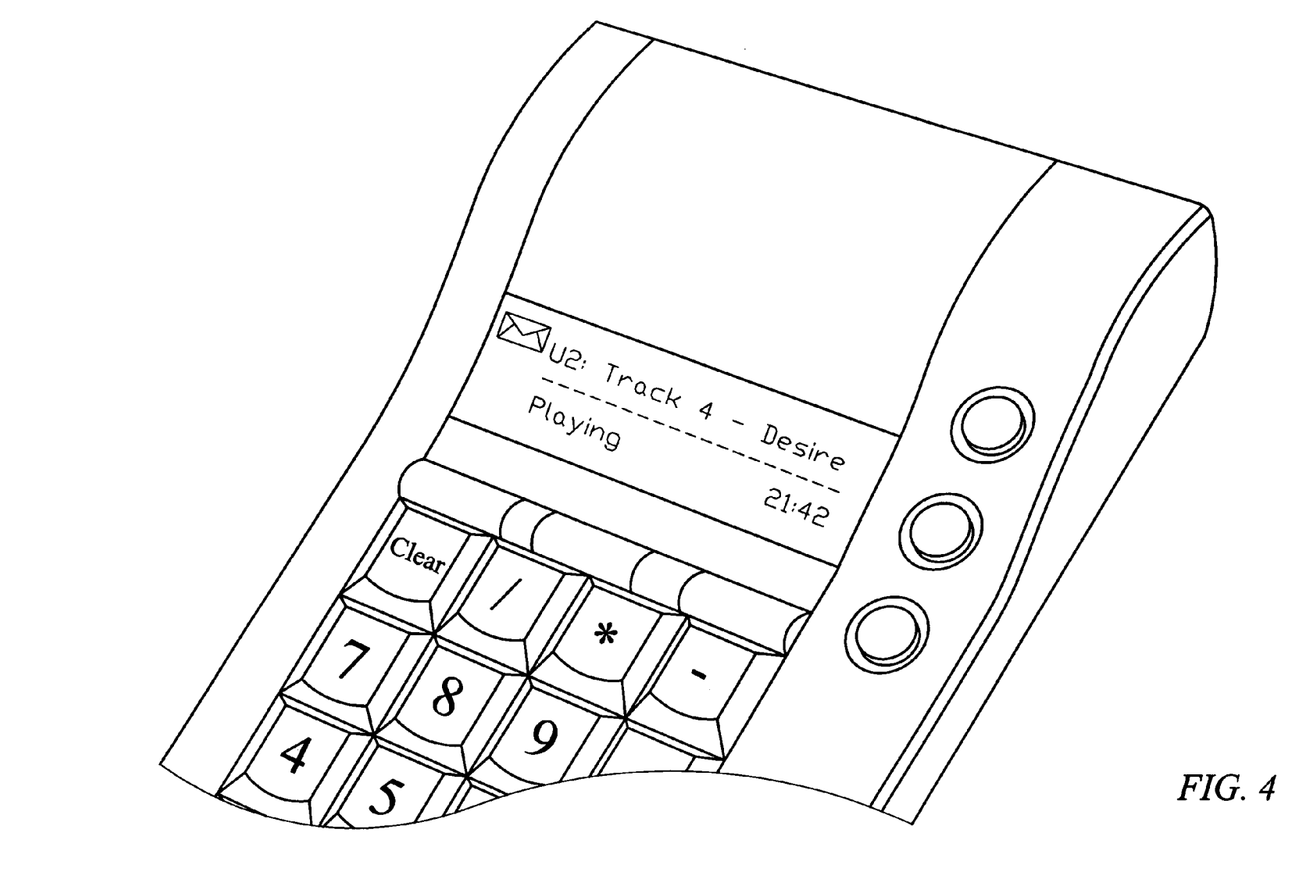
FIG. 4 illustrates a MediaPad™ device according to one embodiment of the present invention.

The number pad and calculator can be used with the computer display, or with the small display on the MediaPad™ device itself. As shown in FIG. 4, the LCD can also display a variety of other information, which is either a subset of what is on the computer display or separate from what is on the computer display. For example:

(1) Music related information, such as the artist's name, song title or track number.

(2) Video-related information, such as the track name and length of video.

(3) Digital pictures related information, such as the name of the picture, and preview of the next image while running a slide show on the monitor.

(4) E-mail notification, a notification one has received a new e-mail in the mailbox.

(5) Instant messaging—the buddy list, instant messages, text messages relayed from a cell phone, etc.

(6) News notifications, such as news headlines, sports scores, and stock prices. The MediaPad™ device can then be used to get more detailed information from the PC monitor. The navigation button allows selection of what should be displayed on the LCD.

By putting the number pad on the MediaPad™ device of the present invention, the keyboard can be made smaller, and more flexibility is provided for the arrangement of the keyboard, mouse and MediaPad™ device on a desktop. For example, the mouse can be placed closer to the keyboard, with the MediaPad™ device being placed on the outside where a mouse would normally be. This allows the user to easily reach the mouse from the keyboard. The low profile and zero degree slope surface of the keyboard and MediaPad™ device shifts the wrist of the user to a more neutral posture. Alternately, the MediaPad™ device can be placed on the left for left-handed users.

Hub 16 of FIG. 1 allows other devices to be connected as well via the Bluetooth™ technology. For example, a connection to a printer can be established, so that print jobs can be initiated from the keyboard, mouse or MediaPad™ device by instructions to application software on the computer, which will then send the print job over the USB cable 18 to the hub 16, which includes a transmitter for sending, using Bluetooth™, the print job to a Bluetooth™-equipped printer. In the present embodiment, the hub is an external receiver that is coupled to the computer, but it may be integrated within the computer other embodiments.

A mobile phone or PDA can also be in communication with Bluetooth™ hub 16. Both can synchronize with the software on the computer through the Bluetooth™ hub. Data, photos, etc. can be shared between the mobile phone, PDA, PC and MediaPad™ device. The shared photos or other data could be sent by e-mail or other applications. Text messages (e.g., SMS messages) received by a cell phone can also be shared via the Bluetooth™ hub when the cell phone is within Bluetooth™ distance of the hub. For example, an SMS text message can be sent from the cell phone, through hub 16 to MediaPad™ device 14 for display on the MediaPad™ device's display. A dialog box can be created on the computer display, and the user, once notified, can go to a keyboard 10 to reply to the text message. This allows a user to use the desktop keyboard, instead of the phone, to do a text message reply.

In another embodiment, a Bluetooth™ headset is used to communicate with hub 16. This can be used for listening to music, or for using a headset and microphone after launching instant message or chat, with the communication over the Bluetooth™ link to hub 16, and from there over the instant messaging (IM) application running on the computer 20.

The present invention with its MediaPad™ device thus allows the personal computer to be used as a real media center, controllable from anywhere within Bluetooth™ range. The MediaPad™ device can be used either with the computer display in a desk usage mode, or using its own LCD display in a mobile usage mode. Information can be exchanged in both directions between the computer and the MediaPad™ device. The LCD display allows the user to have visibility and understanding of the computer application status. The two displays can be used together, with the user using control information on the MediaPad™ device display, for example, but actually viewing a video or photo on the computer display.

Hub 16 provides at least two modes, an embedded mode and a host controller interface (HCI) mode, according to one embodiment. HCI refers to an interface used by Bluetooth™ ("BT") host controller to communicate with a BT device.

Figure 5:
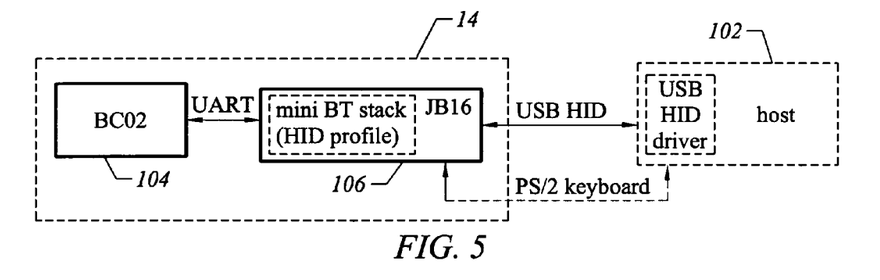
FIG. 5 illustrates the embedded mode according to one embodiment of the present invention.

FIG. 5 illustrates the embedded mode which is a default mode for the hub 16. The hub, a Bluetooth™ (BT) transceiver, is coupled to a host computer 102 via a USB connection in the present embodiment. The hub includes a BT module 104 (or slave module or first module) and a master device 106 (or second module). Module 104 is a BC02 module that is based on a BC02 chipset. Master device 106 is a JB16 including flash memory wherein a mini BT stack is stored. The mini BT stack includes information needed to support no more than three input devices to minimize its size in the present embodiment. In present embodiment, the three input devices supported are a keyboard, a numpad/MediaPad™, and a mouse.

During the embedded mode, the support is limited to the human interface device (HID) profile, and it is possible to connect one BT HID mouse, one BT HID keyboard, and one BT HID numpad (also referred to as MediaPad™). HID refers to a protocol that supports wireless PC devices (such as mice, keyboards, and the like) and Plug and Play. Distinction between a keyboard and a numpad is done using the personal identifier (PID) that are assigned to the these input devices.

The device addresses (also referred to as "BD addresses") of the three paired devices are stored inside the JB16's flash memory, so that connections can be restored automatically when required, e.g., during a wakeup state after a sleep mode. In one embodiment, the flash memory is configured to store 1 kbyte of address space to store non-volatile information, such as BD address of connected BT devices, USB number string, and the like.

As used herein, the term "paired" or "pairing" refers to associating a plurality of devices by assigning a "link key" to these devices for subsequent communication between these devices. The link key is typically used for authentication and encryption between the paired devices. Authentication is initiated by one of the paired devices to check the authenticity of the other device during a reconnection after link loss. The communication between the paired devices are encrypted to prevent unauthorized access to the data being communicated.

As explained above, in the present embodiment, the hub supports up to three input devices during the embedded mode. The hub is provided with a connect button that will commence searching of HID devices (or input devices).

Figure 6:
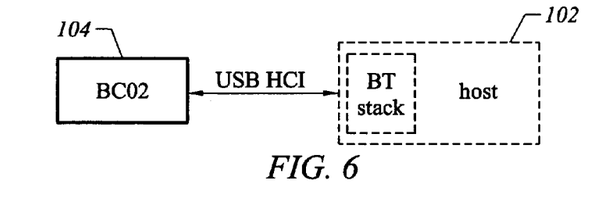
FIG. 6 illustrates the HCI mode according to one embodiment of the present invention.

In the embedded mode the software in the hub or receiver takes care of the following:
 searching sequence,
 reading of the device information (certain SDP information name),
 establishing of the connection (pairing, encryption),
 storing in the hub/receiver the virtual cable information,
 USB interfaces presented to the host are as follows:
 HUB full speed
 HID low speed interface (mouse+keyboard+multimedia keys+ . . . )
HID++ commands that are generally used only in this mode are:
 Find device
 Cancel Find device
 Get Device SDP information FIG. 6 illustrates the HCI mode according to one embodiment, where the BT module 104 communicates with a BT stack in the host directly.

In the HCI mode, the following USB interfaces are presented to the host:
 HUB full speed
 HID low speed interface (mouse+keyboard+multimedia keys+ . . . )
 HCI Bluetooth full speed If the communication link, e.g., UART link, between the MCU and the BT module is closed, no more data can be transferred from one to the other. All the connection and data flow between the device and the host is directly handled by the BT module.

The HID interface is still used to control the LEDs, notify the host if the connect button is pressed, and can handle the following HID++ commands:
 Receiver working mode (switch back to fully embedded or embedded mode with SW control)
 Get/Set virtual cable info.

When entering into USB suspend mode, the BT module (or BC02) is reset in order to switch it back into embedded mode. In embedded mode, it is possible to handle the remote wake-up capabilities, which is not possible in HCI mode. To prevent the host from seeing a disconnection of the BC02 over USB during its reset, the USB pull-up resistor is maintained by the MCU, as long as no resume condition happen. After a resume command is received, the MCU frees the USB pull-up resistor of the BC02 and the receiver/hub stays in the embedded mode. Appendix A provides possible scenarios for the embedded and HCI modes.

Figure 7:
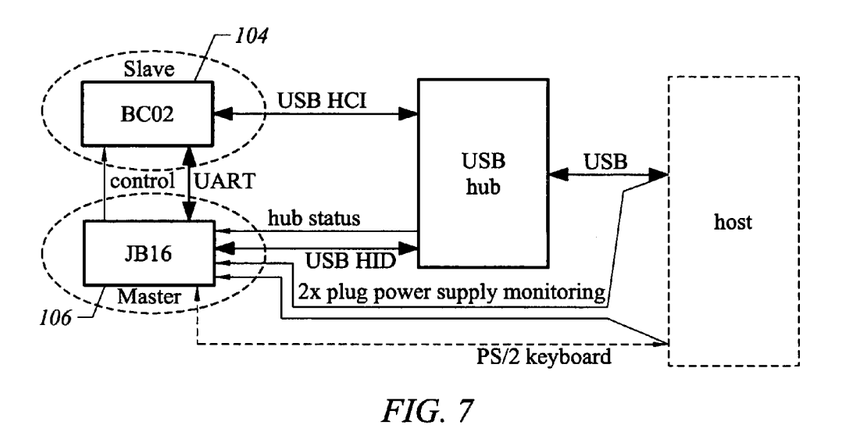
FIG. 7 illustrates a block diagram of the hub according to one embodiment of the present invention.

FIG. 7 illustrates a block diagram of the hub according to one embodiment of the present invention. In order to implement both embedded and HCI modes in a simple way, an external USB hub 108 is used. JB16 module is the master and determines the mode of BC02 module. Under the default embedded mode, JB16 communicates with the USB hub via a USB HID link 109. JB16 controls BC02's power supply, and switches it to HCI mode if specifically required by the host SW, in which case BC02 communicates directly with the USB hub via a USB HCI link 110.

JB16 is generally present on the USB bus regardless of the mode of the BC02 module. When the BC02 module is in HCI mode, no reports are posted by JB16 on its interrupt endpoints, with exception of connect button press notifications.

The hub is configured to check for the connect button status periodically. In one embodiment, the connect button status is checked each 20 ms, and will be considered as depressed at the third time (every 60 ms), to give good debouncing (to improve resistance to EFTB).

A wireless input device according to one embodiment of the present invention can be used. The input device may be a keyboard, a mouse, numpad, or the like. An input module is used to input user commands. These commands are processed by a processor and then forwarded to the BT module to be transmitted to the hub 16. In the present embodiment, the BT module and processor exchange UART and wake signals.

In the present embodiment, software installed in the input device 202 manages the process of search, discovery and configuration without user intervention. The background software at predefined intervals (e.g., 20 msec or 1 sec) checks for the connectivity between the input device and the hub. The hub may also be configured to check to check the connection between the hub and input devices and amongst the hub, input devices, and computer at regular intervals. If any device is indicated to be not properly connected to the computer, the device is automatically connected without the user input. Appendix A lists the steps involved in connecting an input device under various different scenarios. Alternatively, the background software may inform the user of the connection problem and ask whether the connection problem should be resolved.

Figure 8:
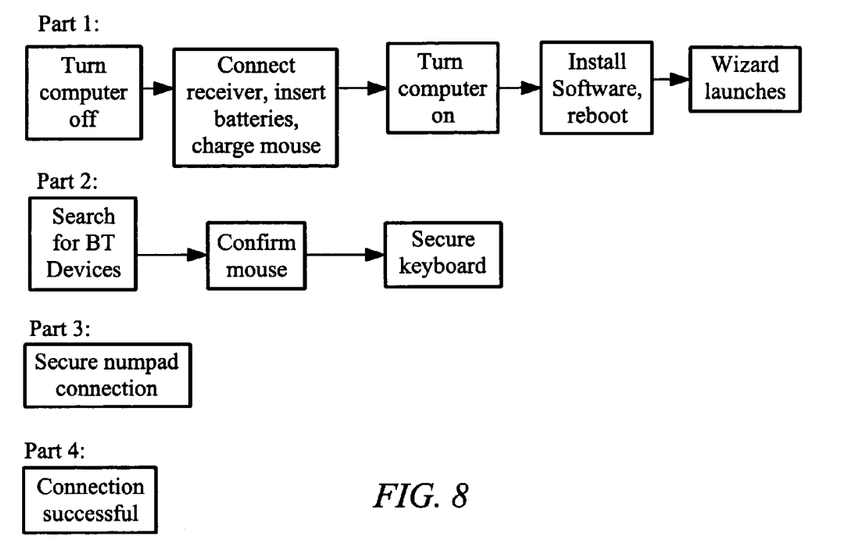
FIG. 8 illustrates a method used according to one embodiment.

FIG. 8 illustrates a method that can be used according to various embodiments. In particular, FIG. 8 shows processes that can be used to secure connections to wireless devices.

Figure 9:
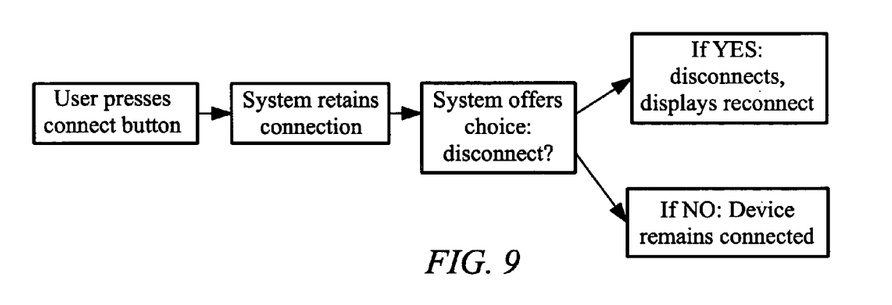
FIG. 9 illustrates a method used according to one embodiment.

FIG. 9 illustrates a method that can be used according to various embodiments. In particular, FIG. 9 illustrates a process that can be used when the connect button is pressed on the hub.

Figure 10:
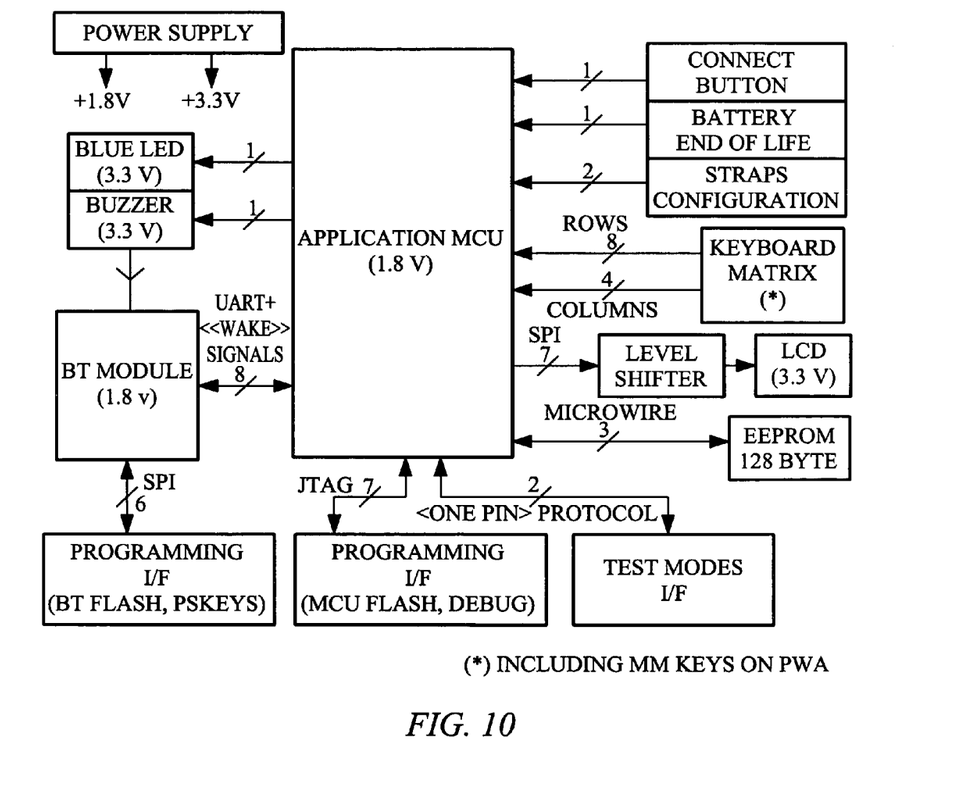
FIG. 10 illustrates a block diagram of the hub according to one embodiment of the present invention.

FIG. 10 illustrates a block diagram of the hub according to one embodiment of the present invention.

Figure 11:
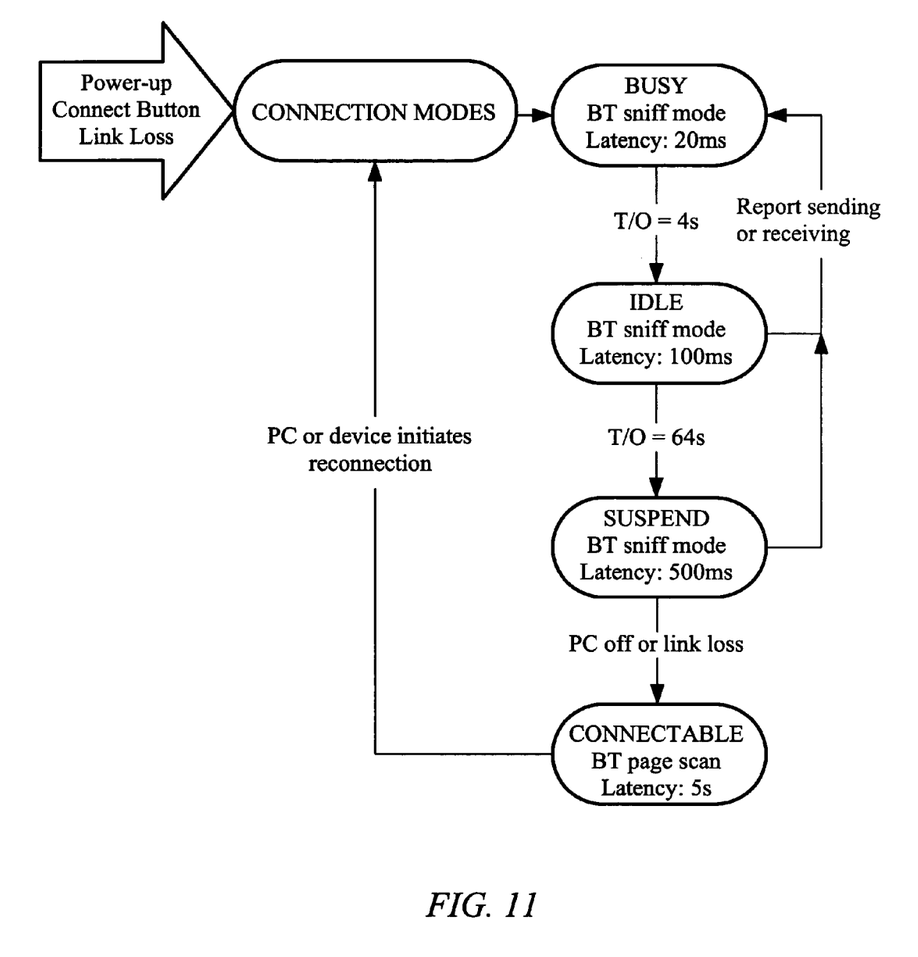
FIG. 11 illustrates a method used according to one embodiment.

FIG. 11 illustrates a method that can be used according to various embodiments. In particular, FIG. 11 illustrates different states of a different power modes.

Figure 12:
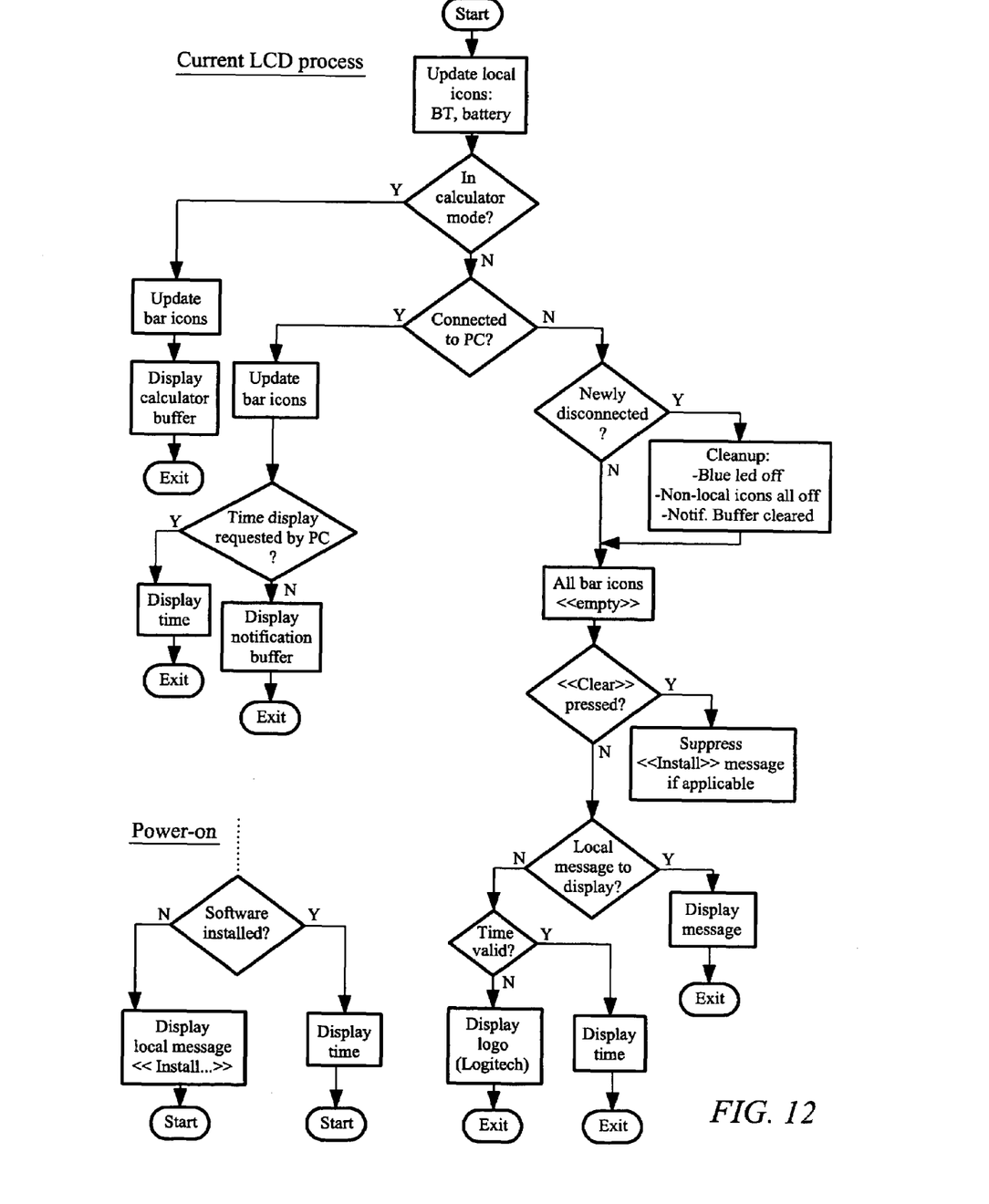
FIG. 12 illustrates a method used according to one embodiment.

FIG. 12 illustrates a method that can be used according to various embodiments. In particular, FIG. 12 illustrates processes used by an LCD of a wireless device is display information.

Figure 13:
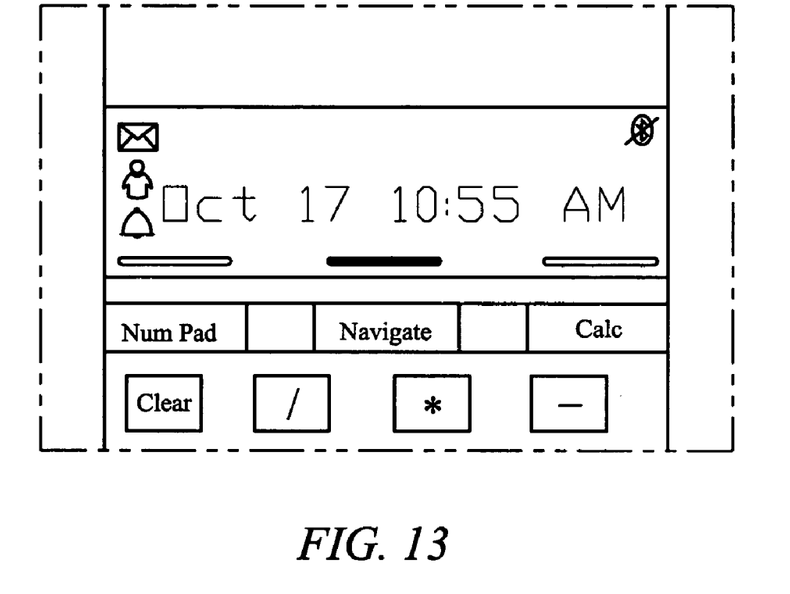
FIG. 13 illustrates a display according to one embodiment.

FIG. 13 illustrates a display according to one embodiment. The display shown in FIG. 13 could be used on the keyboard or MediaPad as illustrated in FIGS. 1-4.

As will be understood by those of skill in the art, the present invention could be embodied in other specific forms without departing from the essence of the invention. Accordingly, the foregoing description is intended to be illustrative, but not limiting, of the scope of the invention which is set forth in the following claims.

What is claimed is:

1. A wireless communication system for a computer, comprising:
    a hub coupled to the computer, the hub including a first module and a second module, the first module configured to receive commands from one or more wireless input devices, the second module configured to control the first module and interface with the computer;
    a first wireless input device configured to be linked to the hub to input a first command to the computer via the hub; and
    a second wireless input device configured to be linked to the hub to input a second command to the computer via the hub,
    wherein the hub is configured to support a first operational mode and a second operational mode,
    wherein the first module transmits the first and second commands received from the first and second input devices to the computer via the second module during the first operational mode, wherein said first operational mode is a connection mode for connecting said input devices to said computer,
    wherein the first module transmits the first and second commands received from the first and second input devices to the computer without using the second module as an interface to the computer during the second operational mode, said second operational mode being for communication after connecting said input devices to said computer.

2. The wireless communication system of claim 1, wherein the first module is a slave device and the second module is a master device.

3. The wireless communication system of claim 1, wherein the first operational mode is an embedded mode that is a default mode and the second operational mode is a host controller interface mode.

4. The wireless communication system of claim 1, wherein the first operational mode enables the hub to support M number of wireless input devices and the second operational mode enables the hub to support N number of wireless input devices, where N is greater than M.

5. The wireless communication system of claim 1, wherein the hub is configured to handle Bluetooth™ technology and the second module of the hub includes a first Bluetooth™ stack that is a condensed version of a second Bluetooth™ stack provided in the computer.

6. The wireless communication system of claim 5, wherein the hub is provided externally from the computer.

7. The wireless communication system of claim 6, wherein the hub is coupled to the computer via a universal serial bus interface of the computer.

8. The wireless communication system of claim 1, wherein the hub is configured to handle Bluetooth™ technology and is provided externally to the computer, wherein the system is configured to check at a predefined interval for wireless connection between the hub and one of the wireless input devices and initiate a connection protocol if the hub and the one of the wireless input devices are determined to be not properly linked.

9. The wireless communication system of claim 1, wherein the hub is configured to handle Bluetooth™ technology and receive a wakeup signal from at least one of the input devices after the computer has been placed in a sleep mode.

10. The wireless communication system of claim 1, further comprising:
    a third wireless input device configured to be linked to the hub to input a third command to the computer via the hub,
    wherein the first, second and third input devices are a mouse, keyboard, and numpad, respectively,
    wherein the first operational mode is an embedded mode that is a default mode and the second operational mode is a host controller interface mode,
    wherein the hub is configured to support no more than three input devices during the embedded mode and support at least five input devices during the host controller interface mode.

11. The wireless communication system of claim 1, wherein the hub is configured to receive information from a mobile telephone and transmit the received information to the computer.

12. The wireless communication system of claim 11, wherein the information is a text message.

13. The wireless communication system of claim 1, wherein the hub is able to bi-directionally switch between the first operational mode and the second operational mode.

14. A wireless communication system for a host, comprising:
    an external hub coupled to the host, the hub including a first module and a second module, the first module configured to receive commands from one or more wireless input devices, the second module configured to control the first module;
    a wireless keyboard configured to be linked to the hub to input a first command to the host via the hub; and
    a wireless pointing device configured to be linked to the hub to input a second command to the host via the hub,
    wherein the hub is configured to support a first operational mode, wherein said first operational mode is a connection mode for connecting said input devices to said computer, and a second operational mode said second operational mode being for communication after connecting said input devices to said computer,
    wherein the hub is configured to support M number of peripheral devices in the first operational mode and N number of peripheral devices in the second operational mode, wherein N is greater than M,
    wherein the first module transmits the first and second commands received from the keyboard and pointing device to the host via the second module during the first operational mode, wherein the first module transmits the first and second commands received from the keyboard and pointing device to the host without using the second module as an interface to the host during the second operational mode.

15. The wireless communication system of claim 14, wherein the second module includes a Bluetooth™ stack to handle the first and second commands during the first operational mode.

16. The wireless communication system of claim 14, wherein the hub is configured to receive first information from a peripheral device and transmit second information corresponding to the first information to the host.

17. The wireless communication system of claim 16, wherein the peripheral device is a mobile phone, personal digital assistant, MP3 player, or digital camera.

18. The wireless communication system of claim 14, wherein the hub is able to bi-directionally switch between the first operational mode and the second operational mode.

19. A method for operating a computer system, the method comprising:
   connecting a hub to a host computer, said hub being configured to communicate wirelessly with at least two peripheral devices;
   pairing a wireless mouse to the hub to enable input of first information that has been generated using the mouse to the computer via the hub; and
   pairing a wireless keyboard to the hub to enable second information that has been generated using the keyboard to the computer via the hub,
   wherein the hub is configured to support a first operational mode and a second operational mode, the hub being able to support a different number of input devices for each of the first and second operational modes, wherein said first operational mode is a connection mode for connecting said peripheral devices to said computer, and said second operational mode being for communication after connecting said peripheral input devices to said computer,
   wherein the hub includes a first module and a second module, the first module configured to receive the first and second information from the keyboard and mouse, the second module configured to control the first module and including a program that is operable to process the first and second information received from the keyboard and mouse,
   wherein the first module transmits the first and second information from the keyboard and mouse to the host via the second module during the first operational mode,
   wherein the first module transmits the first and second information from the keyboard and mouse to the host without using the second module as an interface to the host during the second operational mode.

20. The method of claim 19, further comprising:
   pairing a mediapad to the hub to enable input of third information that has been generated using the mediapad to the computer via the hub.

21. The method of claim 19, wherein the hub is able to bi-directionally switch between the first operational mode and the second operational mode.

22. A wireless communication system for a computer, comprising:
   a hub coupled to the computer, the hub including a first connection interface to the computer and a second connection interface to the computer,
   a first wireless input device configured to be linked to the hub to input a first command to the computer via the hub; and
   a second wireless input device configured to be linked to the hub to input a second command to the computer via the hub,
   wherein the hub is configured to support a first operational mode and a second operational mode,
   wherein the hub transmits the first and second commands received from the first and second input devices to the computer via the first connection interface during the first operational mode,
   wherein the hub transmits the first and second commands received from the first and second input devices to the computer via the second connection interface during the second operational mode,
   wherein the second connection interface transmits the first and second commands received from the first and second input devices to the computer without using the first connection interface to the computer during the second operational mode.

23. The wireless communication system of claim 22, wherein the first connection interface is a USB HID interface and the second connection interface is a USB HCI interface.

24. The wireless communication system of claim 22, wherein the first operational mode is an embedded mode that is a default mode and the second operational mode is a host controller interface mode.

25. The wireless communication system of claim 22, wherein the first operational mode enables the hub to support M number of wireless input devices and the second operational mode enables the hub to support N number of wireless input devices, where N is greater than M.

26. The wireless communication system of claim 22, wherein the hub is configured to handle Bluetooth™ technology and includes a first Bluetooth™ stack that is a condensed version of a second Bluetooth™ stack provided in the computer.

27. The wireless communication system of claim 26, wherein the hub is provided externally from the computer.

28. The wireless communication system of claim 27, wherein the hub is coupled to the computer via a universal serial bus interface of the computer.

29. The wireless communication system of claim 22, wherein the hub is configured to handle Bluetooth™ technology and is provided externally to the computer, wherein the system is configured to check at a predefined interval for wireless connection between the hub and one of the wireless input devices and initiate a connection protocol if the hub and the one of the wireless input devices are determined to be not properly linked.

30. The wireless communication system of claim 22, wherein the hub is configured to handle Bluetooth™ technology and receive a wakeup signal from at least one of the input devices after the computer has been placed in a sleep mode.

31. The wireless communication system of claim 22, further comprising:
   a third wireless input device configured to be linked to the hub to input a third command to the computer via the hub,
   wherein the first, second and third input devices are a mouse, keyboard, and numpad, respectively,
   wherein the first operational mode is an embedded mode that is a default mode and the second operational mode is a host controller interface mode, wherein the hub is configured to support no more than three input devices during the embedded mode and support at least five input devices during the host controller interface mode.

32. The wireless communication system of claim 22 wherein the first connection interface is managed by a first module in the hub, wherein the second connection interface is managed by a second module in the hub, wherein the first and second commands pass through the first module and the second module during the first operational mode, wherein the first and second commands do not pass through the first module during the second operational mode.

33. The wireless communication system of claim 32 wherein the first module includes a program that is operable to process the first and second commands before the commands are transmitted to the computer in the first operational mode.

* * * * *

UNITED STATES PATENT AND TRADEMARK OFFICE
CERTIFICATE OF CORRECTION

PATENT NO. : 7,629,958 B2  Page 1 of 1
APPLICATION NO. : 10/886064
DATED : December 8, 2009
INVENTOR(S) : Nicolet et al.

It is certified that error appears in the above-identified patent and that said Letters Patent is hereby corrected as shown below:

On the cover page, item

[*] Notice: should read as follows: Subject to any disclaimer, the term of this patent is extended or adjusted under 35 USC 154(b) by (1427) days.

Signed and Sealed this

Thirteenth Day of July, 2010

David J. Kappos
*Director of the United States Patent and Trademark Office*